(12) United States Patent
Alsayyed et al.

(10) Patent No.: US 6,909,925 B2
(45) Date of Patent: Jun. 21, 2005

(54) KNOWLEDGE BASED RECYCABLE MATERIALS SYSTEM

(75) Inventors: Basil Alsayyed, Windsor (CA); Oleg Lukibanov, Rochester, MI (US); Bing Li, Troy, MI (US); Larry Bahm, Bloomfield, MI (US); Susan Yester, West Bloomfield, MI (US); Bing Xu, Lake Orion, MI (US); James Mitchell, Romeo, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 216 days.

(21) Appl. No.: 10/310,500

(22) Filed: Dec. 5, 2002

(65) Prior Publication Data

US 2004/0111172 A1 Jun. 10, 2004

(51) Int. Cl.7 .............................................. G06F 19/00
(52) U.S. Cl. ........................................ 700/95; 700/103
(58) Field of Search ..................... 700/95–97, 103–107, 700/109, 117; 702/84

(56) References Cited

U.S. PATENT DOCUMENTS 6,163,732 A * 12/2000 Petke et al. .................. 700/106

6,477,517 B1 * 11/2002 Limaiem et al. ............... 706/45
2002/0052666 A1 * 5/2002 Fakatsu et al. ............. 700/107

OTHER PUBLICATIONS

"360 Degrees– Environmental Report 2003", 2003, Daimler Chrysler. □□.*
Sriram et al., "Environmental Issues in Collaborative Design" Sep. 2000, Manufacturing Systems Integration Division.*
Georgia Institute of Technology Systems Realization Laboratory, "Design for Recycling", Date 2000 or earlier, Georgia Institute of Technology.*

* cited by examiner

Primary Examiner—Leo Picard
Assistant Examiner—Chad Rapp
(74) Attorney, Agent, or Firm—Ralph E. Smith

(57) ABSTRACT

A method and system for upfront analysis of at least one substance used in the design process of a vehicle. A vehicle ontology is created that is stored in a database. The vehicle ontology records all the substances used in the design of the vehicle along with all the attributes of the substances and the relations between the substances. All the standards for the substances and the attributes of the standards are recorded in a materials ontology. A knowledge base engine, e.g., the database, analyzes the materials ontology to determine whether a substance conforms to a standard, e.g., a recyclability requirement.

9 Claims, 2 Drawing Sheets

KNOWLEDGE BASED RECYCABLE MATERIALS SYSTEM

FIELD OF THE INVENTION

The present invention relates to a method for identifying a substance of concern in a vehicle during the vehicle design process.

BACKGROUND INFORMATION

Vehicle manufacturers must meet various environmental regulations and requirements from regulatory agencies such as the Environment Protection Agency and the European Union. These regulations may dictate recyclability requirements for the vehicles.

Other systems provide identification of substances of concern, i.e., substances that do not meet regulatory requirements after the vehicle has been through the design process and the vehicle has been produced or at later points in the design process of the vehicle.

SUMMARY OF THE INVENTION

The method and system according to the present invention involve analysis of substances used in the design process of a vehicle. The substances are analyzed to determine whether the substance conforms to a standard, e.g., a recyclability requirement. A database is used to store information regarding vehicle standards and the characteristics of the substances used in the design. A determination is made as to whether the substance conforms to the standard on the basis of the standards and the substance characteristics stored in the database.

By providing analysis capabilities at an early point in the design process, the system may allow for changes to the design of the vehicle or vehicle product to be made at the initial design step point in the design process. This may eliminate the cost of making such changes to the vehicle or vehicle product and the problem of redesigning the vehicle at later points in the design process.

DETAILED DESCRIPTION

An exemplary embodiment according to the present invention utilizes ontology to build a knowledge base that may be stored in a database. An ontology is a specification of items and all the relationships between the items. Ontology is used for the purpose of modular design, redesign and reuse of knowledge and it also insulates the rules in the knowledge base from the data itself. In the exemplary embodiment, two main ontologies are generated. The first main ontology is a materials ontology that includes all the materials attributes related to recyclability along with all the relationships of the different types of materials. The second main ontology is a vehicle ontology that includes all the substances of the vehicle, e.g., the parts, components and subsystems of the vehicle, along with their attributes and relationships. A heuristic approach may be used to manipulate the data and initialize the knowledge base engine, e.g., a processor connected to the database, to execute the analysis and generate reports and/or warnings regarding substances and recyclability.

Figure 1:
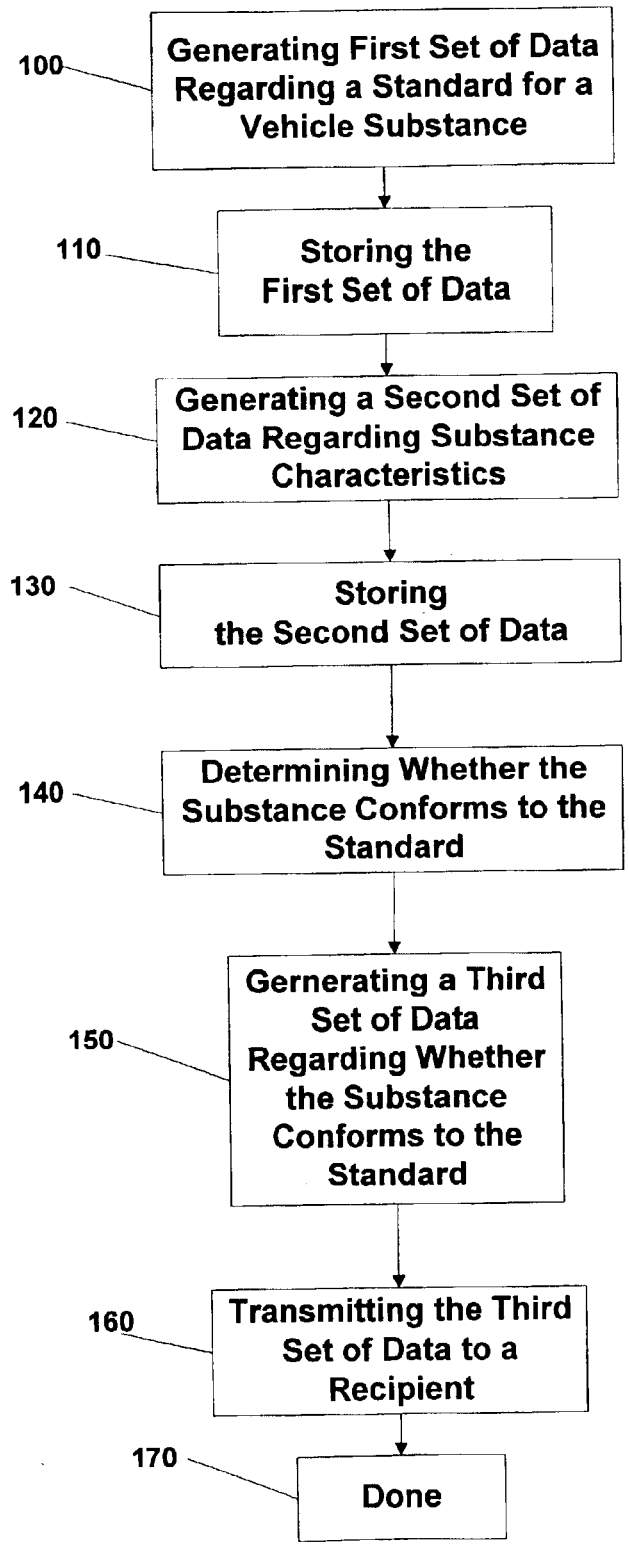
FIG. 1 shows an exemplary method according to the present invention.

FIG. 1 shows an exemplary method according to the present invention. The method involves analysis of at least one substance used in the design process of a vehicle. The substance is analyzed to determine whether the at least one substance conforms to a standard, i.e., a recyclablity requirement, set by a regulatory agency such as the Environmental Protection Agency or the European Union. In step 100, a first set of data, e.g., a materials ontology, is generated that describes a standard for one or more substances used in the design of the vehicle. A materials ontology may include data regarding all substances of concern, the regulations, restrictions, and controlled materials. The standard may be a recyclability requirement for the substance. In step 110, the first set of data is stored. The first set of data may be stored in a database. Then in step 120 a second set of data, e.g., a vehicle ontology, is generated regarding characteristics of one or more substance used in vehicle design. A vehicle ontology may include data regarding all the substances, parts, components and subsystems of the vehicle along with their characteristics and attributes such as the material standard, dismantling rating of all parts used in vehicle design. In step 130, the second set of data is stored. The second set of data may be stored in the database. In step 140, a determination is made as to whether the at least one substance conforms to the standard. This determination is made on the basis of the first set of data and the second set of data, for example, by determining whether a value of a characteristic of the substance, as indicated in the second set of data, e.g. the vehicles ontology, is within a range of values for that characteristic as set forth in the standard as indicated in the first set of data, e.g., the materials ontology. In step 150, a third set of data, e.g., the results of the determination, is generated indicating whether the substance conforms to the standard. In step 160, the third set of data is transmitted to a recipient that may be concerned with the determination of whether the substance conforms to the standard, e.g., a design manager or project analyst. In step 170, the method according to the present invention is done.

Figure 2:
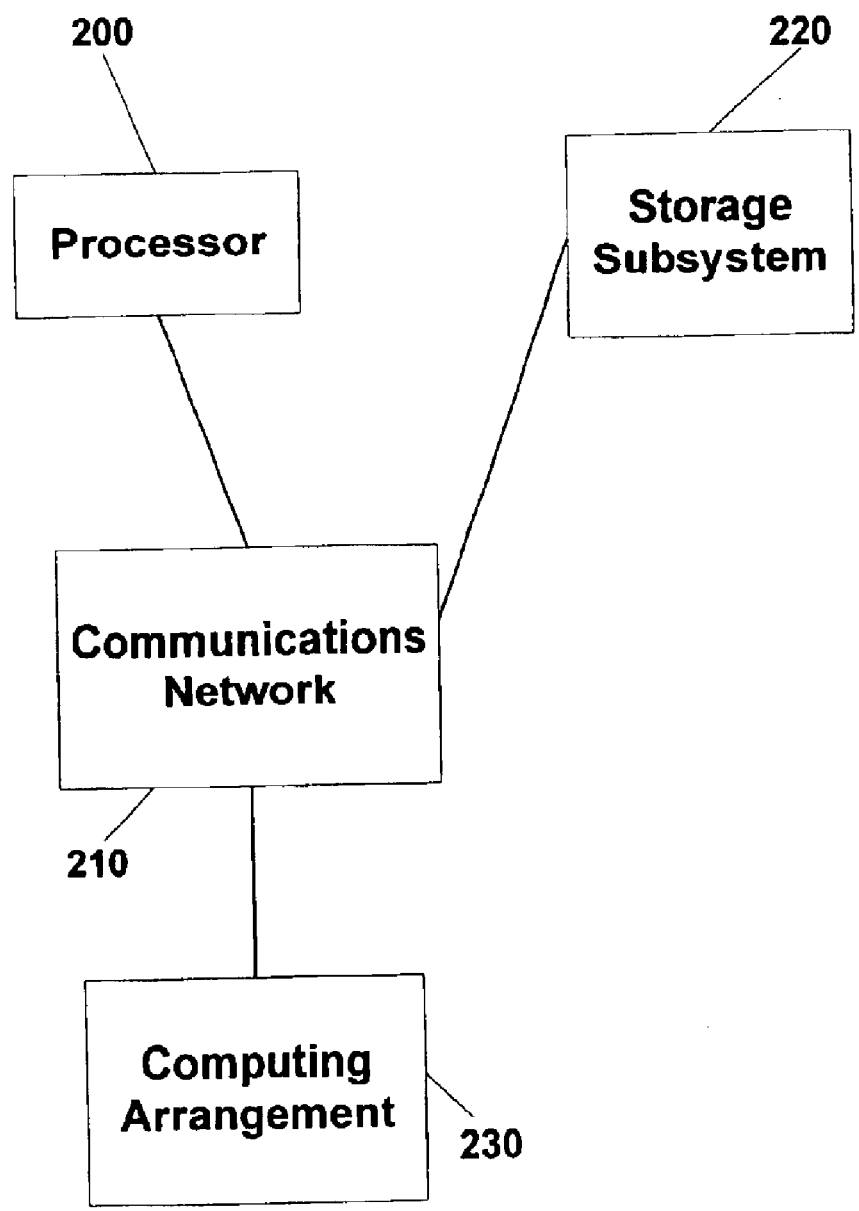
FIG. 2 shows an exemplary system according to the present invention.

FIG. 2 describes a system for execution of the method referred above in reference to FIG. 1. A processor 200 executes the method according to the present invention. The processor 200 may include a computer server arrangement. The method according to the present invention is stored as a set of instructions that is accessible and executable by the processor 200. This set of instructions is stored in a storage subsystem 220. The storage subsystem may include a database, a compact disk, hard drive, DVD-ROM, CD-ROM, or any type of computer-readable storing medium. Within the system, a user may utilize the computing arrangement 230 to generate the first set of data, e.g., a materials ontology, regarding a standard for a substance used in the vehicle design. The computing arrangement 230 may be, for example, a personal computer, a computer network, a wireless computing device or a wireless computing network. The computing arrangement 230 communicates with the processor 200 via a communications network 210. The user utilizes the computing arrangement 230 to store the standard on the storage subsystem 220. Also, the user may utilize the computing arrangement 230 to generate the second set of data, e.g., a vehicle ontology, regarding the characteristics for the at least one substance used in the vehicle design. The user utilizes the computing arrangement 230 to store the second set of data in the storage subsystem 220. The processor 200 uses the set of instructions stored on the storage subsystem 220 to determine whether the substance conforms to the standard and to generate the third set of data, e.g., the results of the determination. Processor 200 uses the communications network 210 to transmit the third set of data to the computer arrangement 230 to inform a user of the system whether the substance conforms to the standard.

What is claimed is:

1. A method for analysis of at least one substance used in a design process of a vehicle, comprising:
   (a) generating a first set of data regarding a substance recyclability requirement standard for the at least one substance;
   (b) storing the first set of data in a database;
   (c) generating a second set of data regarding at least one characteristic of the at least one of substance used in the design process of the vehicle;
   (d) storing the second set of data in the database;
   (e) determining on a basis of the first set of data and the second set of data whether the at least one of substance conforms to the standard;
   (f) generating a third set of data indicating whether the at least one of substance conforms to the standard; and
   (g) transmitting the third set of data to a recipient;
   wherein the first set of data is a materials ontology and the second set of data is a vehicle ontology.

2. The method of claim 1, wherein the transmission step (g) is performed using a computing arrangement in communication with a processor via a communications network.

3. The method of claim 2, wherein the processor includes a computer server arrangement.

4. A computer-readable storing medium storing a set of instructions, the set of instructions capable of being executed by a processor to implement a method for analysis of a plurality of substances used in a design process of a vehicle, the set of instructions performing the steps of:
   (a) generating a first set of data regarding a substance recyclability requirement standard for the at least one substance;
   (b) storing the first set of data in a database;
   (c) generating a second set of data regarding at least one characteristic of the at least one of substance used in the design process of the vehicle;
   (d) storing the second set of data in the database;
   (e) determining on a basis of the first set of data and the second set of data whether the at least one of substance conforms to the standard;
   (f) generating a third set of data indicating whether the at least one of substance conforms to the standard; and
   (g) transmitting the third set of data to a recipient;
   wherein the first set of data is a materials ontology and the second set of data is a vehicle ontology.

5. The computer-readable storing medium of claim 4, wherein the transmission step (g) is performed using a computing arrangement in communication with the processor via a communications network.

6. The computer-readable storing medium of claim 5, wherein the processor includes a computer server arrangement.

7. A system comprising:
   a processor;
   at least one computing arrangement configured to communicate with the processor via a communications network; and
   a computer-readable storing medium storing a set of instructions, the set of instructions capable of being executed by the processor to implement a method for analysis of a plurality of substances used in a design process of a vehicle, the set of instructions performing the steps of:
   (a) generating a first set of data regarding a substance recyclability requirement standard for the at least one substance;
   (b) storing the first set of data in a database;
   (c) generating a second set of data regarding at least one characteristic of the at least one of substance used in the design process of the vehicle;
   (d) storing the second set of data in the database;
   (e) determining on a basis of the first set of data and the second set of data whether the at least one of substance conforms to the standard;
   (f) generating a third set of data indicating whether the at least one of substance conforms to the standard; and
   (g) transmitting the third set of data to a recipient;
   wherein the first set of data is a materials ontology and the second set of data is a vehicle ontology.

8. The system of claim 7, wherein the transmission step (g) is performed using the at least one computing arrangement in communication with the processor via the communications network.

9. The system of claim 8, wherein the processor includes a computer server arrangement.

* * * * *